Dec. 24, 1935.    A. H. OELKERS ET AL    2,025,343
WHEEL AND AXLE ASSEMBLY
Filed April 18, 1927
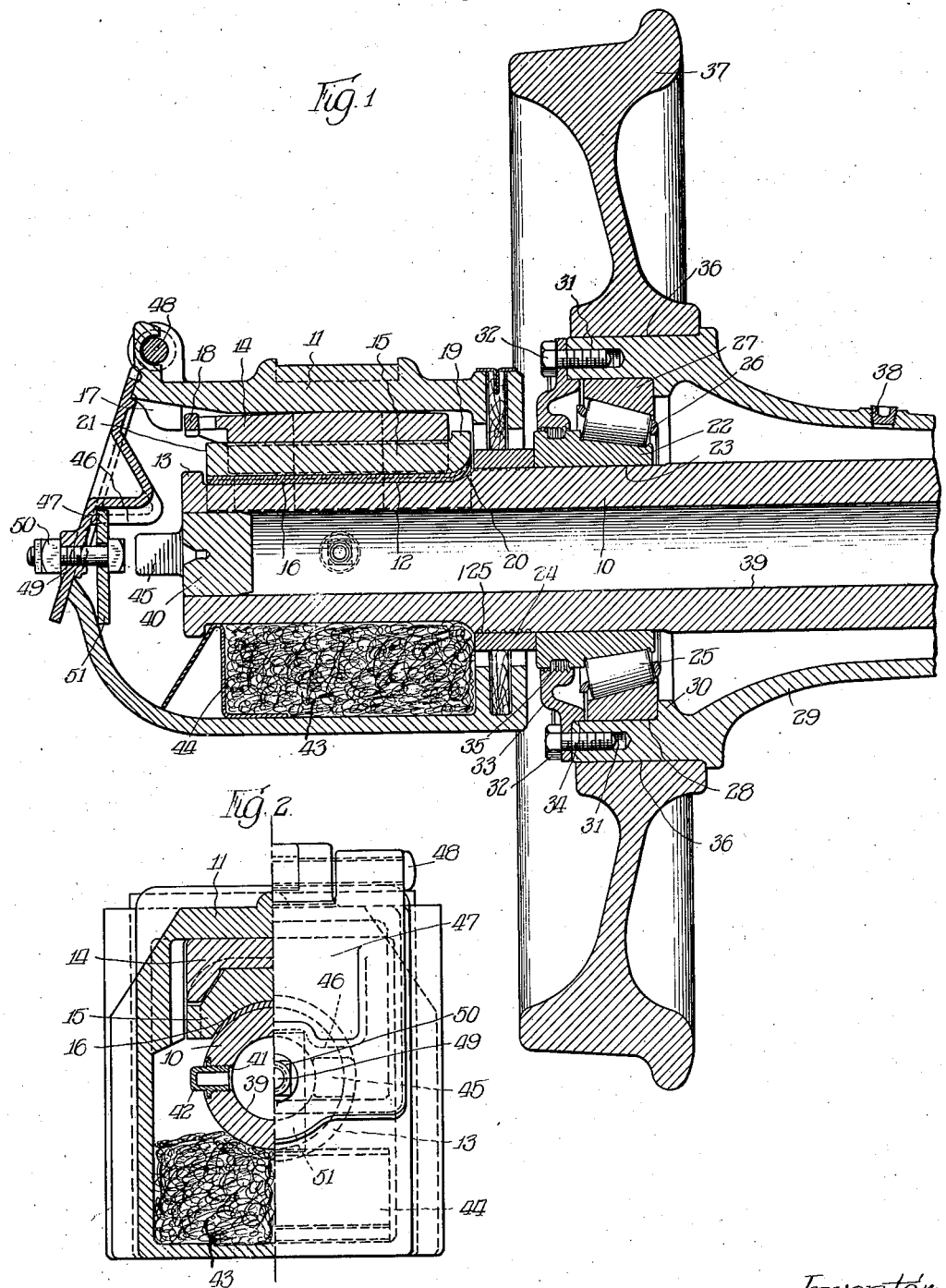
Inventor:
Alfred H Oelkers,
George G Floyd,
By Wilkinson Huxley Byron & Knight
Attys.
Witness:
R. Burkhardt Patented Dec. 24, 1935

2,025,343

UNITED STATES PATENT OFFICE 2,025,343

WHEEL AND AXLE ASSEMBLY

Alfred H. Oelkers and George G. Floyd, Chicago, Ill., assignors to American Steel Foundries, Chicago, Ill., a corporation of New Jersey Application April 18, 1927, Serial No. 184,469

21 Claims. (Cl. 295—36)

This invention relates to wheel and axle assemblies for railroad cars, and more particularly to wheel and axle assemblies embodying anti-friction bearings and having a normally stationary axle mounted in a standard journal bearing, such as the A. R. A. journal bearing, which forms a bearing support capable of functioning in the manner of the usual journal type wheel and axle, in the event the antifriction bearings fail.

Our invention proceeds accordingly upon the principles of providing an inner axle normally stationary and having its ends provided with journal bearing portions mounted in the standard A. R. A. journal boxes with bearing engagement upon the standard journal brasses, and providing on the inner axle spaced antifriction bearings which carry an outer tubular rotating axle on which the wheels are mounted.

One of the objects of our invention is to provide a device of the above described type in which the inner axle is normally held stationary relative to the journal bearing support until an abnormal torque is developed, as in the case of the locking of the anti-friction bearing or failure of any description.

Another object of our invention is to provide a holding means for the inner axle which is releasable and which when released, will assume a position to indicate the condition of the development of abnormal torque or failure of the anti-friction bearing.

Another object of our invention is to provide a journal bearing support in combination with an anti-friction bearing which is normally inactive and free of lubricant, but which contains an auxiliary supply of lubricant sealed for emergency use as when the inner axle starts rotating.

Another object of our invention is to provide means for releasing the lubricant as set forth in the above stated object, which means will be operative by virtue of the relative movement of the stationary axle and the journal bearing brass to establish a communication between the supply of lubricant and the journal box, the lubricant spilling onto a quantity of waste placed in the lower portion of the journal box which is in engagement with the bearing portion of the axle in the customary manner.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a cross sectional elevational view of one end of a wheel and axle assembly and journal box constructed in accordance with our invention.

Figure 2 is an end view as seen from the left of the device shown in Figure 1, being partly in cross section.

Inasmuch as the two end portions of our axle assembly are identical in structure for the purpose illustrated in this invention, only one end will be described.

Referring to the drawing, it will be noted that our invention embodies an inner normally stationary axle 10 which has outer ends extending into the journal boxes 11, provided with reduced bearing surfaces 12, in engagement with the standard A. R. A. journal brasses. Though the inner axle is shown in cooperation with the standard A. R. A. journal box, it is to be understood that any journal box may be used or a direct cooperation with the side frame or retainer.

The flange 13 is provided on the outer end of the axle in a manner similar to the customary journal axle, the shape and size being identical with that of the standard A. R. A. friction axles in order that the anti-friction wheel and axle assemblies may be completely interchangeable with the usual type of friction axle by merely removing the friction axle and placing the new anti-friction assembly into the journal boxes in engagement with the same journal brasses and wedges in the manner shown in Figure 1. Journal box 11 is provided with the bearing wedge 14 and the usual bearing plate or brass 15, having a facing of suitable bearing metal 16 in engagement with the bearing portion 12 of the axle 10. The lug 17 which is on the under surface of the upper portion of the journal box is adapted to engage the abutment 18 on the bearing wedge which in turn engages at its opposite end the upstanding flange 19 on the bearing brass to impart axial thrust in one direction to the inner axle, by means of the brass engaging the shoulder 20 provided on the axle 10. Thrusts in the opposite direction are imparted to the bearing brass by means of lateral lugs, not shown, projecting from the sides of the journal box in engagement therewith, and by the edge 21 of the brass contacting the end flange 13 of the axle. These provisions for the transmission of thrusts are old and similar to those provided on the standard A. R. A. constructions, it being adaptable to our anti-friction assembly by means of providing the bearing portion 12, flange 13 and shoulder 20 of the same configuration as the standard journal axles.

Inwardly of the journal box, the inner race ring 22 is mounted with a pressed fit as at 23 and is held against lateral outward movement by the annular collar 24. The collar 24 is in engagement with the roughened surface 125 on the axle, and is mounted by heating and shrinking it into position, where it closely binds the axle and holds the inner race ring against outward movement also serving to accommodate end thrust imparted to the assembly to prevent any tendency of the journal brass to ride up on the enlarged portion of the inner axle. A series of anti-friction rollers 25, held in proper spaced relation by the cage 26 are positioned to rotate on the inner race ring and form a bearing support for the outer race ring 27, which has a pressed fit as at 28 in the outer tubular axle 29. The shoulder 30 is provided on the inner surface of the tubular axle for engagement with the outer race ring to form a limiting stop for the race ring in one direction. While a certain type of anti-friction bearing is provided, any form is contemplated, such as the Shaffer, Simplex, etc., the bearings being faced in any direction, i. e., the conical bearings shown may be faced with the small ends outwardly. In that case the journal box lid may be used as a retainer together with the shoulder (not numbered) provided on the inner axle. A plurality of threaded openings 31 are provided in the outer end of the outer tubular axle for receiving bolts 32 screwed therein to support the annular guard plate 33, which has a shoulder 34 in engagement with the outer edge of the tubular axle 29. The guard plate extends radially inwardly in a manner to closely surround a portion of the inner race ring to form a closing plate for the bearing and has a plurality of grooves 35 on its inner cylindrical surface to catch and prevent the escape of oil from the bearing cavity. The outer tubular axle has a cylindrical surface 36 on which is mounted the wheel 37. The space provided between the outer tubular axle 29 and inner axle 10 forms a chamber for containing lubricant to supply the anti-friction bearing, the lubricant being supplied through the plug 38 in the outer tubular axle. The inner axle 10 is also hollow forming the chamber 39, the chamber being closed by end plugs fitted in the ends of the axle. A threaded opening 41 is provided in the end portion of the axle 10 to establish communication between the inner chamber 39 and the interior of the journal box. This opening is preferably situated approximately midway the length of the journal bearing and is closed by a plug 42 which projects outwardly from the periphery of the axle. The plug 42 is made of a frangible material and is capable upon rotation of the inner axle of being sheared off by engagement with the bearing brass 15. Located in the lower portion of the journal box there is a pad or quantity of dry waste 43 held in place in engagement with the under surface of the axle by the support 44.

Projecting from the outer end of the axle 10 are two lugs 45 which are diametrically opposite each other and operate to form a fin for engaging the shelf 46 provided on the inner surface of the journal box lid 47. The journal box lid is pivoted at the top on the bolt 48 and is locked shut by means of the bolt 49, nut 50 and locking plate 51 at the lower edge thereof. The purpose of the lugs 45 and the shelf 46 is to hold the inner normally stationary axle against rotation, but to permit rotation thereof when an abnormal torque is developed by failure of the anti-friction bearings. In providing for this feature, the journal box may be equipped with a special lid which has the shelf 46 constructed on its inner surface, or an attachment in the form of the shelf 46 may be applied to the inner surface of the customary journal box lid for accomplishing the same purpose. This feature is a matter of installation and may be determined according to the needs in each case.

In operation, it is possible with the device constructed in accordance with our invention to equip railroad cars having the usual side frame journal boxes and standard A. R. A. journal axles, by merely removing the standard wheel and axle and substituting our anti-friction assembly, and in normal operation the outer tubular axle and wheels will revolve about the inner axle 10 on the anti-friction bearings, the inner axle being non-rotatably held in the journal boxes on the customary journal brasses. During the normal operation, the journal box lid is fastly closed and the inner axle is releasably held against rotation by means of the lugs 45 engaging the shelf 46. During such operation, the journal box is free of lubricant, the waste 43 being dry and the plug 42 being intact as shown in Figure 2. The inner chamber 39 of the axle 10 contains a supply of lubricant which is hermetically sealed by means of the plug 42, but which is only released to lubricate the journal bearing in the event the journal bearing rotates. This operation takes place in the event of the locking or failure of the anti-friction bearing which binds the outer rotating axle 29 immovable relative to the inner axle 10, whereby the inner axle 10 is forced to rotate by the establishment of the abnormal torque in the journal bearing. When this occurs, the frangible plug 42 is brought into contact with the edge of the journal brass 15 where it is sheared off and communication is established between the lubricant chamber and the journal box. This operates to saturate the pad of waste located in the bottom of the axle box with lubricant, which by virtue of its engagement with the entire bearing surface lubricates the journal bearing in the customary manner.

One of the features of our invention is that the journal box lid, by the forced rotation of the inner axle is forced open or is broken and it thus assumes a position which is readily visible to a car inspector, indicating that the anti-friction bearing is not functioning properly and an abnormal torque has been developed to cause a forced rotation of the inner axle. The journal bearing is capable of serving as a bearing for the wheel and axle for so long a period as desired, and until it is convenient to repair the condition which causes the binding between the outer rotating axle and the inner axle.

In practicing the invention, it may be desirable to provide special journal box lids or in some instances, to merely provide a shelf and proper locking means on the customary journal box lids, whereby our anti-friction assembly may be completely interchangeable with the standard A. R. A. axle assembly without providing special parts.

We claim:

1. In a wheel and axle assembly for railroad cars, the combination of a normally stationary axle mounted in journal boxes having a bearing fit therewith, an outer rotating axle having wheels thereon, anti-friction bearings between said axles, and means provided on the journal box lid for releasably holding said normally stationary axle against rotation.

2. In a wheel and axle assembly for railroad cars, the combination of a normally stationary axle mounted in journal boxes having a bearing fit therewith, an outer rotating axle having wheels thereon, anti-friction bearings between said axles, and means for releasably holding said normally stationary axle against rotation, said means being adapted to indicate the release condition of said axle.

3. In a wheel and axle assembly for railroad cars, the combination of a normally stationary axle mounted in journal boxes having a bearing fit therewith, an outer rotating axle having wheels thereon, anti-friction bearings between said axles, and means provided on the journal box lid for releasably holding said normally stationary axle against rotation, said lid being adapted to open or rupture when said stationary axle rotates under abnormal torque.

4. In a railroad wheel and axle assembly, the combination of a journal bearing, an anti-friction bearing and means for engaging the axle to normally force relative rotation at said anti-friction bearing, said means permitting relative movement at said journal bearing upon failure of said anti-friction bearing.

5. In a railroad wheel and axle assembly, the combination of a journal bearing, an anti-friction bearing and means for engaging the axle to normally force relative rotation at said anti-friction bearing, said means permitting relative movement at said journal bearing upon failure of said anti-friction bearing, said means indicating occurrence of relative rotation at said journal bearing.

6. An anti-friction wheel and axle assembly having a normally stationary axle mounted on the standard A. R. A. journal bearings adapted to serve as journal bearings when the anti-friction bearings fail, a source of lubricant, and means for releasing said lubricant when said journal bearings function.

7. In a wheel and axle assembly for railroad cars, the combination of an anti-friction bearing and a journal bearing independently mounted with respect thereto, said journal bearing being normally inactive but capable of operation when said anti-friction bearing fails, a source of hermetically sealed lubricant, and means for releasing said lubricant when said journal bearing starts into operation.

8. In a device of the class described, the combination of a plurality of independently mounted bearings, one of which is normally inactive but capable of operation upon failure of said other bearing, a source of lubricant for said normally inactive bearing, and means for releasing said lubricant upon operation thereof.

9. In an anti-friction wheel and axle assembly the combination of a journal box and bearing, a normally stationary axle mounted therein capable of rotation under conditions of abnormal torque, said box and bearing being substantially free of lubricant when said axle is stationary, but having a source of lubricant releasable when said axle rotates.

10. In an anti-friction wheel and axle assembly, a normally stationary hollow axle mounted in a journal bearing and capable of rotation under abnormal conditions of torque, said axle containing lubricant to be released when said axle rotates.

11. In an anti-friction wheel and axle assembly, the combination of a normally stationary hollow axle mounted in a journal bearing and capable of rotation under abnormal conditions of torque, said axle containing lubricant and having frangible closing means adapted to be ruptured to release the lubricant upon rotation of said axle.

12. In an anti-friction wheel and axle assembly, the combination of a normally stationary hollow axle mounted in a journal bearing and capable of rotation under abnormal conditions of torque, said axle containing lubricant and having frangible closing means adapted to engage the bearing brass upon rotation to release the lubricant.

13. In a wheel and axle assembly, the combination of a journal box cover, said cover being provided with axle cooperating means independent of the wheel for controlling rotary movement of the axle.

14. In a wheel and axle assembly, the combination of concentric normally fixed and rotary axles, bearings between said axles, wheels fixedly mounted on said rotary axle, standard A. R. A. journal boxes having standard A. R. A. brasses cooperating with reduced end portions of said fixed axle, a lid for each journal box provided with a shelf, and means on said fixed axle cooperating with said shelf to prevent rotation of the fixed axle, the lid serving as condition indicating means upon failure of the bearings between axles.

15. In a wheel and axle assembly, the combination of concentric normally fixed and rotary axles, bearings between said axles, wheels fixedly mounted on said rotary axle, journal boxes having bearings contacting with end portions of said fixed axle and operative upon movement of said fixed axle, a lid for each journal box provided with a shelf, and means on said fixed axle cooperating with said shelf to prevent rotation of the fixed axle, the lid serving as condition indicating means upon rotation of said normally fixed axle.

16. In combination with a rotating member, a member spaced therefrom, anti-friction bearings between said members, a bearing box for one of said members, a lid for said box, said lid having a projection adapted to have cooperative relation with one of said members for limiting rotation thereof.

17. The combination of a normally stationary member, an outer rotary member disposed adjacent thereto, anti-friction members disposed between said stationary and rotary members, one of said first named members having a bearing portion, a box having means cooperating with said bearing portion, said box being provided with a lid cooperating with a portion of said first named member for limiting rotation thereof.

18. The combination of a normally stationary member, an outer rotary member disposed adjacent thereto, anti-friction members disposed between said stationary and rotary members, one of said first named members having a bearing portion, a box having means cooperating with said bearing portion, said box being provided with a shelf cooperating with a portion of said first named member for limiting rotation thereof.

19. In combination, a normally non-rotatable axle, load carrying means, means mounted on said load carrying means supporting said load carrying means on an end of said axle, said supporting means being provided with a bearing for abnormal rotation of said axle, means on said load supporting means displaceable by said axle upon rotation thereof under abnormal force to indicate said rotation, said means preventing rotation of said axle under normal operation.

20. In combination, a normally non-rotatable axle, load carrying means having a journal box for supporting said load carrying means on an end of said axle, said journal box being provided with a bearing for abnormal rotation of said axle, means on said journal box displaceable by said axle upon rotation thereof under abnormal force to indicate said rotation, said means preventing rotation of said axle under normal operation.

21. In combination, a normally non-rotatable axle, load carrying means having a journal box for supporting said load carrying means on an end of said axle, said journal box being provided with a lid and having a bearing for abnormal rotation of said axle, means on said journal box lid and axle interengaging under normal operation of said axle to prevent rotation thereof, said lid being displaced by said interengaging means upon rotation of said axle under abnormal force to indicate rotation thereof.

ALFRED H. OELKERS.
GEORGE G. FLOYD.

CERTIFICATE OF CORRECTION.

Patent No. 2,025,343.                                           December 24, 1935.

ALFRED H. OELKERS, ET AL.

It is hereby certified that error appears in the printed specification of the above numbered patent requiring correction as follows: Page 2, second column, line 36, for "journal bearing" read axle; and that the said Letters Patent should be read with this correction therein that the same may conform to the record of the case in the Patent Office.

Signed and sealed this 18th day February, A. D. 1936.

Leslie Frazer
Acting Commissioner of Patents.

(Seal)